United States Patent [19]

Novak

[11] Patent Number: 4,692,130

[45] Date of Patent: Sep. 8, 1987

[54] LOAD BLOCK FOR CHAIN-BELT

[75] Inventor: Gary J. Novak, Villa Park, Ill.

[73] Assignee: Borg-Warner Corporation, Chicago, Ill.

[21] Appl. No.: 860,379

[22] Filed: May 6, 1986

Related U.S. Application Data

[63] Continuation-in-part of Ser. No. 719,401, Apr. 3, 1985, abandoned.

[51] Int. Cl.⁴ .................................................. F16G 5/18
[52] U.S. Cl. ..................................... 474/201; 474/242
[58] Field of Search ................ 474/201, 242, 244, 245

[56] References Cited

U.S. PATENT DOCUMENTS

| | | | |
|---|---|---|---|
| 1,691,892 | 11/1928 | Reeves | 474/245 |
| 3,720,113 | 3/1973 | Van Doorne et al. | 74/236 |
| 4,313,730 | 2/1982 | Cole, Jr. et al. | 474/201 |
| 4,493,679 | 1/1985 | Miranti, Jr. | 474/201 |
| 4,512,754 | 4/1985 | Cole, Jr. et al. | 474/245 |
| 4,581,000 | 4/1986 | Ferfecki | 474/201 |

FOREIGN PATENT DOCUMENTS 0012147  1/1982  Japan ................................... 474/245

Primary Examiner—James A. Leppink
Assistant Examiner—Thuy M. Bui
Attorney, Agent, or Firm—Florian S. Gregorczyk; James A. Geppert

[57] ABSTRACT

A load block for a chain-belt constructed of interleaved sets of links and load blocks in which the load blocks have a window with a window-bottom defining a surface relieved so that the load transferred from the links to the load blocks occurs mainly through the outermost or edge links.

2 Claims, 5 Drawing Figures

LOAD BLOCK FOR CHAIN-BELT

CROSS-REFERENCE TO RELATED APPLICATIONS

This application is a continuation-in-part of U.S. application Ser. No. 719,401 filed Apr. 3, 1985, now abandoned.

BACKGROUND OF THE INVENTION

Variable pulley transmissions for transferring torque from an input or drive shaft to an output or driven shaft have been used for some time. In these transmissions, a first pulley constructed of a pair of flanges is mounted on the input shaft such that at least one of the flanges is axially movable with respect to the other flange. A second, similar pair of pulley flanges are mounted on the output shaft. A flexible belt connects the two pulleys to transfer torque from the input shaft to the output shaft. As the effective diameters of the pulleys are simultaneously and inversely varied, the drive ratio between the input and output shafts is adjusted in a smooth, continuous manner.

Automotive engineers recognize that the operating efficiency of an internal combustion engine be enhanced by adjusting the transmission to varying loads and speed ratios. This enhancement has not been possible in a conventional, fixed-ratio gear transmission and engine arrangement. In a conventionally geared transmission, the drive ratio is adjusted in discrete steps, rather than continuously over the operating range. Accordingly, recent research efforts have been directed to the use of a continuously variable transmission (CVT). These efforts have resulted in the development of passenger cars using a flexible and continuous rubber belt to drivingly interconnect the pulleys. Rubber belts are subject to wear from the torque load, temperature, vibration and other adverse conditions. Development efforts are continuing to improve the belt life and to produce a flexible belt of metal, which efforts are described in the literature.

Flexible metal belts for use with CVTs are frequently categorized as "push" belts and as "pull" belts. An example of a push belt is described in U.S. Pat. No. 3,720,113—Van Doorne et al. Similarly, a pull belt is described in U.S. Pat. No. 4,313,730—Cole, Jr. et al. The Van Doorne et al—'113 belt comprises an endless carrier with a plurality of nested metal bands and an endless array of generally trapezoidal (when viewed from the front) load blocks encircling the carrier and longitudinally movable therewith. Each block has edge surfaces to frictionally engage the pulley flanges of a pulley transmission to transmit torque between the pulleys.

The pull belt of Cole, Jr. et al—'730 utilizes an endless chain as the carrier, the sets of links of which are pivotably interconnected by pivot means, shown as round pins. Load blocks, similar to those of Van Doorne et al—'113, encircle the links; however, the load blocks are constrained against longitudinal movement along the chain by the pivot means.

U.S. Pat. No. 4,493,679—Miranti, Jr. teaches a belt structure wherein a tension member 43 is positioned in a window 36 of a load block. However, the load block provides a curved surface to centrally contact the tension member.

The push belt described above is relatively expensive to manufacture and must be installed and/or replaced as a complete, endless loop. Therefore, belt repair, maintenance or initial assembly require disassembly of parts of the pulley transmission.

The pull belt offers a less expensive alternative to the push belt as no precise matching of carrier parts is required. The pull belt can be assembled with a finite length, positioned around the pulleys, and thereafter the ends are connected by a pivot member to form an endless belt. Thus, disassembly of the pulleys or transmission components is not required either for initial installation or for replacement of a belt.

Theoretically a load block entering a pulley, either on a push belt or a pull belt, is radially oriented with respect to the pulley. However, during operation the block may tilt and enter the pulley at some other angle. When the block's "window" or "windows", i.e., the opening or openings in which the block carrier is located, are made with essentially square defining edges, the tilting of the blocks causes the top and/or the bottom edges (toward the pulley and away from the pulley, respectively) to dig into and damage the carrier, seriously affecting the carrier's torque bearing and transmitting ability. As a consequence, the damaged carrier may prematurely fail. An unproven, proposed solution to the block tilt problem is to slightly round the top and bottom window defining surfaces from front to back which increases the belt manufacturing costs.

SUMMARY OF THE INVENTION

The invention describes a chain-belt with a new and novel load block wherein the bottom window defining surface is relieved or contoured, such that a central portion does not contact the lace plate links of the carrier set of links. The load on the block is thus transferred to the links mainly through the outermost lace plate links of the carrier set of links. The bending moment at a particular point, which develops due to the transfer of load from the load blocks to the outermost lace plate links, is reduced when compared to the bending moment of load blocks known in the art.

BRIEF DESCRIPTION OF THE DRAWINGS

In the figures of the drawing, like reference numerals identify like components, and in that drawing.

DESCRIPTION OF THE PREFERRED EMBODIMENT

Figure 1:
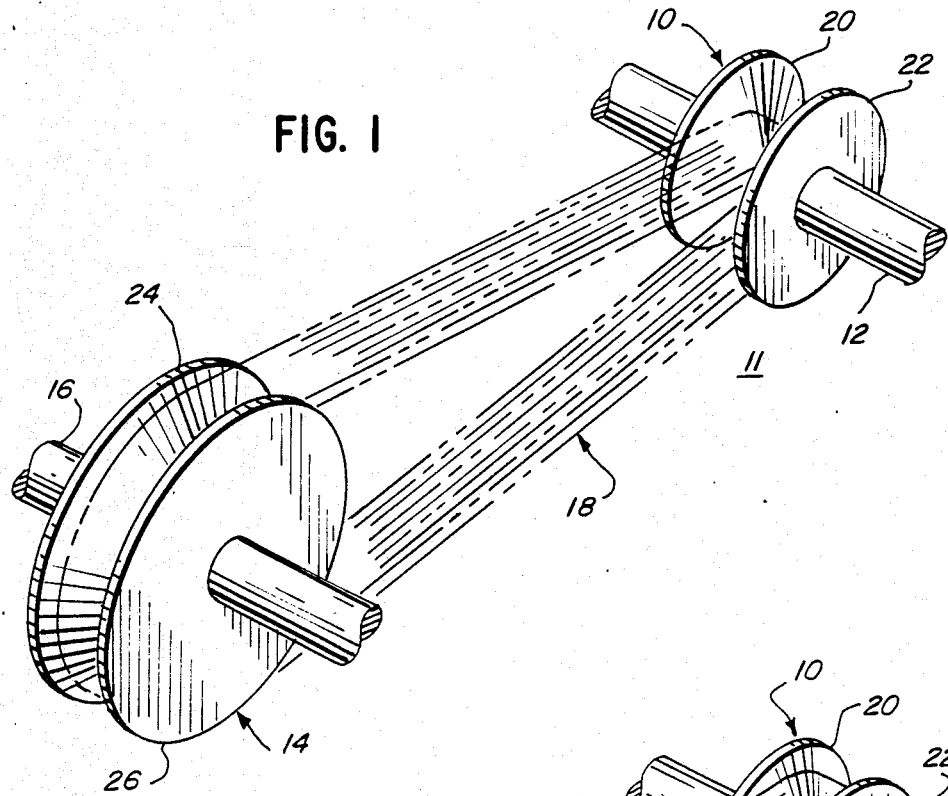
FIGS. 1 and 2 are schematic illustrations of a CVT in two, extreme drive ratios.
Figure 2:
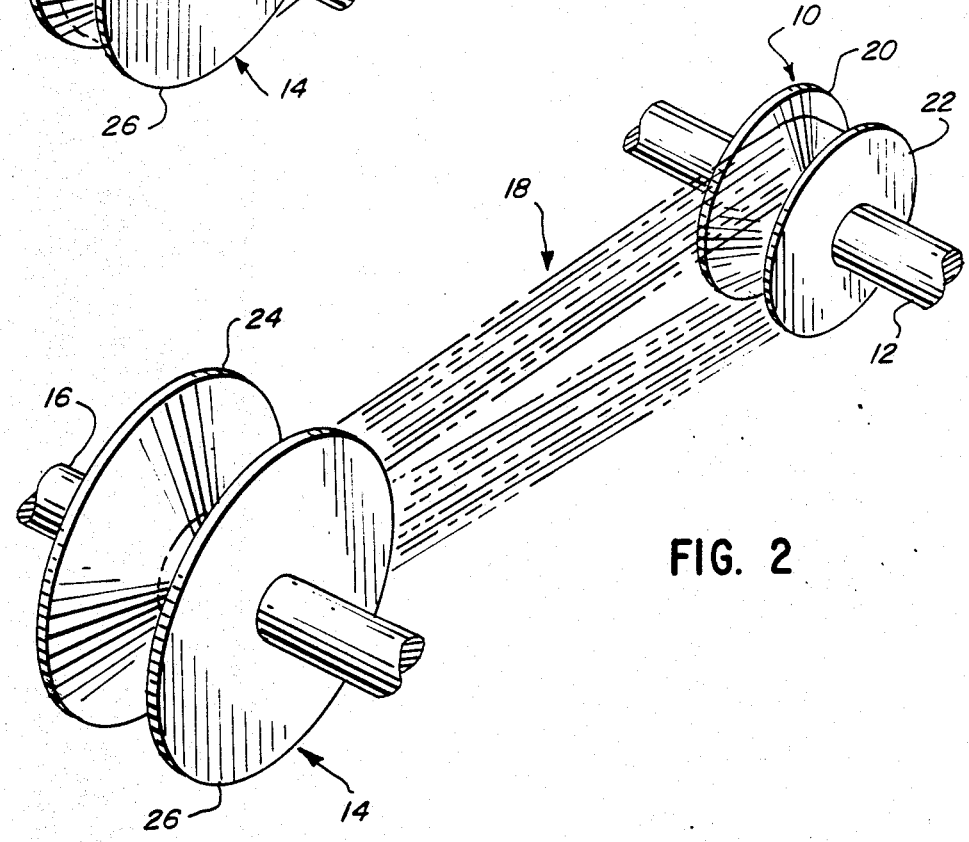

FIGS. 1 and 2, schematically illustrate a basic CVT or pulley transmission 11 in two extreme drive ratios. In these figures, a first pulley 10 is drivingly connected to a drive or input shaft 12 and a second pulley 14 is drivingly connected to a driven or output shaft 16. Pulleys 10 and 14 are connected by a belt 18, such as a chain-belt. Pulley 10 is comprised of flanges 20 and 22 while pulley 14 includes flanges 24 and 26. At least one flange of each pulley 10, 14 is axially movable relative to its respective shaft to effect drive ratio changes. Various systems, which may be mechanical, hydraulic, electrical, or a combination system thereof, can be provided for moving the flanges to modify the drive ratios between the pulleys. Such systems are beyond the scope of this invention and will not be described but are known in the art.

Figure 3:
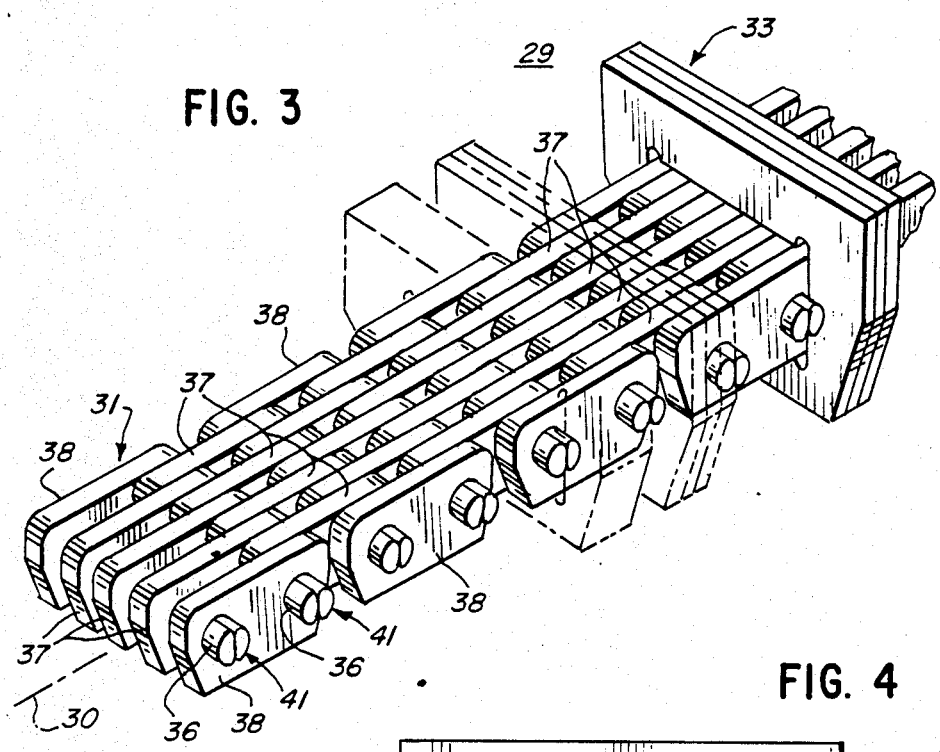
FIG. 3 is an isometric illustration of a segment of a chain-belt according to this invention.

A segment of a chain-belt or tension member 29, is illustrated in FIG. 3 (it being understood that the chain-belt 29 is a continuous loop). Chain-belt 29 comprises the combination of a carrier 31 and a plurality of load blocks 33 of either one piece construction or a laminate assembly of a number of thinner load block plates. An assembly of plates 33 is advantageous as the thin plates can be easily die stamped from sheet stock material, thereby avoiding costly machining.

Carrier 31 in FIG. 3 has a longitudinal axis 30 and comprises a plurality of interlaced links 37 including edge links 38 illustrated in a 5-4-5 alternating set arrangement, although the particluar carrier configuration is not relevant to the invention. Each link 37, 38 defines a pair of apertures 36 to receive a pivot means 41 through the transversely aligned apertures 36 of adjacent links to join the alternating sets of links 37 and edge links 38, which permits articulation of the carrier 31 to engage pulleys 10 and 14 of the pulley transmission. The pivot means 41 can be a round pin or a pin and rocker, both known in the art. As illustrated in FIG. 3, a load block 33, which may be either a solid member or a plurality of thin plates, encircles each set of links 37 between adjacent pivot means 41.

Figure 4:
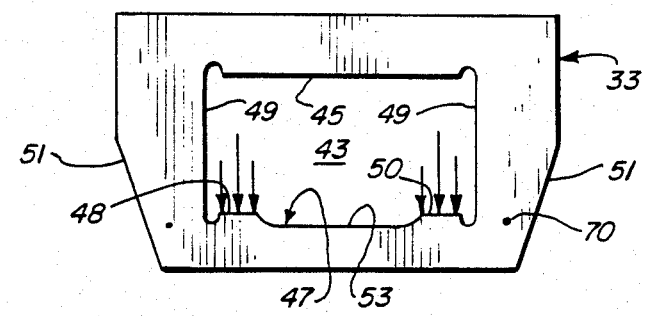
FIG. 4 is a front elevational of a load block according to this invention.

Each load block 33, as shown in FIG. 4, has a generally trapezoidal shape and defines a window 43 with a top surface 45, a bottom surface 47 and mirrored side surfaces 49. Load blocks 33 define outer edge surfaces 51, which surfaces 51 frictionally engage the flanges of the pulleys 10 and 14 of a transmission. FIG. 3 is representative of a load block arrangement, however, chain belts with load blocks with skipped sets of links are known in the art.

In FIG. 4 bottom surface 47 defines central relief segment 53 and coplanar surfaces 48 and 50, with relief segment 53 below the plane of surfaces 48 and 50. The resultant load, primarily from edge links 38, is applied to the surfaces 48 and 50 flanking central relief segment 53, as indicated by the arrows representing applied load. The coplanar surfaces 48 and 50 provide the sole stress support in the structure of window 43 within load block 33.

Figure 5:
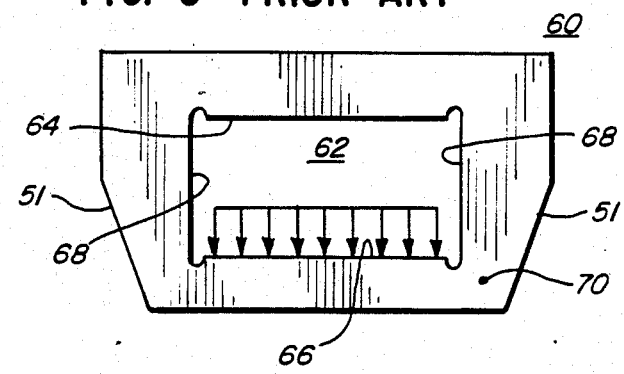
FIG. 5 is a front elevational of a prior art load block.

A prior art load block 60, illustrated in FIG. 5, defines a window 62 with top surface 64, bottom surface 66 and side surface 68. Bottom surface 66 is generally a single plane. Therefore, the load of carrier 31 would be applied, as indicated by the arrows, along the entire surface 66.

The bending moment on each load block at a random point 70 (see FIGS. 4 and 5) from the transfer of load from the load blocks 33 to links 37 is reduced due to the preferred force distribution when using the invention herein described.

While only specific embodiments of the invention have been described and shown, it is apparent that various alterations and modifications can be made therein. It is, therefore, the intention in the appended claims to cover all such modifications and alterations as may fall within the true scope and spirit of the invention.

I claim:

1. A load block for an endless chain-belt for a pulley transmission having at least two pulleys, which chain-belt comprises:
    a carrier including a plurality of links arranged in alternating sets, said sets of links interlaced and joined by pivot means;
    a plurality of load blocks, at least one of said load blocks positioned on said carrier between adjacent pivot means;
    each of said load blocks defining a single window to receive said carrier therethrough, which window includes a bottom surface, a top surface and two mirrored side surfaces defining said window;
    wherein the improvement comprises a pair of coplanar load bearing surfaces adjacent the side surfaces separated by a central relief segment therebetween below the plane of said load bearing surfaces forming said window bottom surface, which load bearing surfaces provide the sole means of stress support in the window of said load blocks.

2. A load block as claimed in claim 1, in which said sets of links include edge links contacting said load bearing surfaces of said bottom surface to transfer load between said load block and carrier when said chain-belt engages said pulleys of the pulley transmission.

* * * * *